United States Patent [19]

Pugh

[11] Patent Number: 4,486,669
[45] Date of Patent: Dec. 4, 1984

[54] WIND GENERATOR KITE SYSTEM

[76] Inventor: Paul F. Pugh, 4082 Sequoyah Rd., Oakland, Calif. 94605

[21] Appl. No.: 319,112

[22] Filed: Nov. 9, 1981

[51] Int. Cl.³ .......................... B64B 1/50; F03D 9/00
[52] U.S. Cl. ...................................... 290/44; 244/33; 244/154; 290/55
[58] Field of Search ................. 290/44, 55; 244/154, 244/155 A, 92, 39, 59, 53 B, 26, 27, 33

[56] References Cited

U.S. PATENT DOCUMENTS

| | | | |
|---|---|---|---|
| 3,229,517 | 1/1966 | Smith | 244/33 |
| 4,076,190 | 2/1978 | Lois | 290/55 |
| 4,084,102 | 4/1978 | Fry et al. | 244/33 |
| 4,166,596 | 9/1979 | Mouton, Jr. et al. | 244/33 |
| 4,285,481 | 8/1981 | Biscomb | 290/55 |
| 4,327,296 | 4/1982 | Weyers | 290/42 |
| 4,350,896 | 9/1982 | Benoit | 244/33 |

Primary Examiner—G. Z. Rubinson
Assistant Examiner—Shelley Wade

[57] ABSTRACT

This invention relates to a new system for generating electrical energy by wind power.

The wind generator is suspended in the air like a kite by wind currents and is attached to the earth by a high strength cable to which are attached electric cables and a natural gas pipe.

The numerous small wind generators are mounted in a box-like kite enclosure, which are raised to the desired elevation by rotary blade power with the assistance of a gas balloon.

The wind generator kite is raised and lowered to the proper elevation for maximum electrical output.

A complete system, including control methods, permits the production of electricity at a lower cost than conventional methods and provides means for generating large amounts of power with a high load factor.

16 Claims, 1 Drawing Figure

U.S. Patent    Dec. 4, 1984    4,486,669
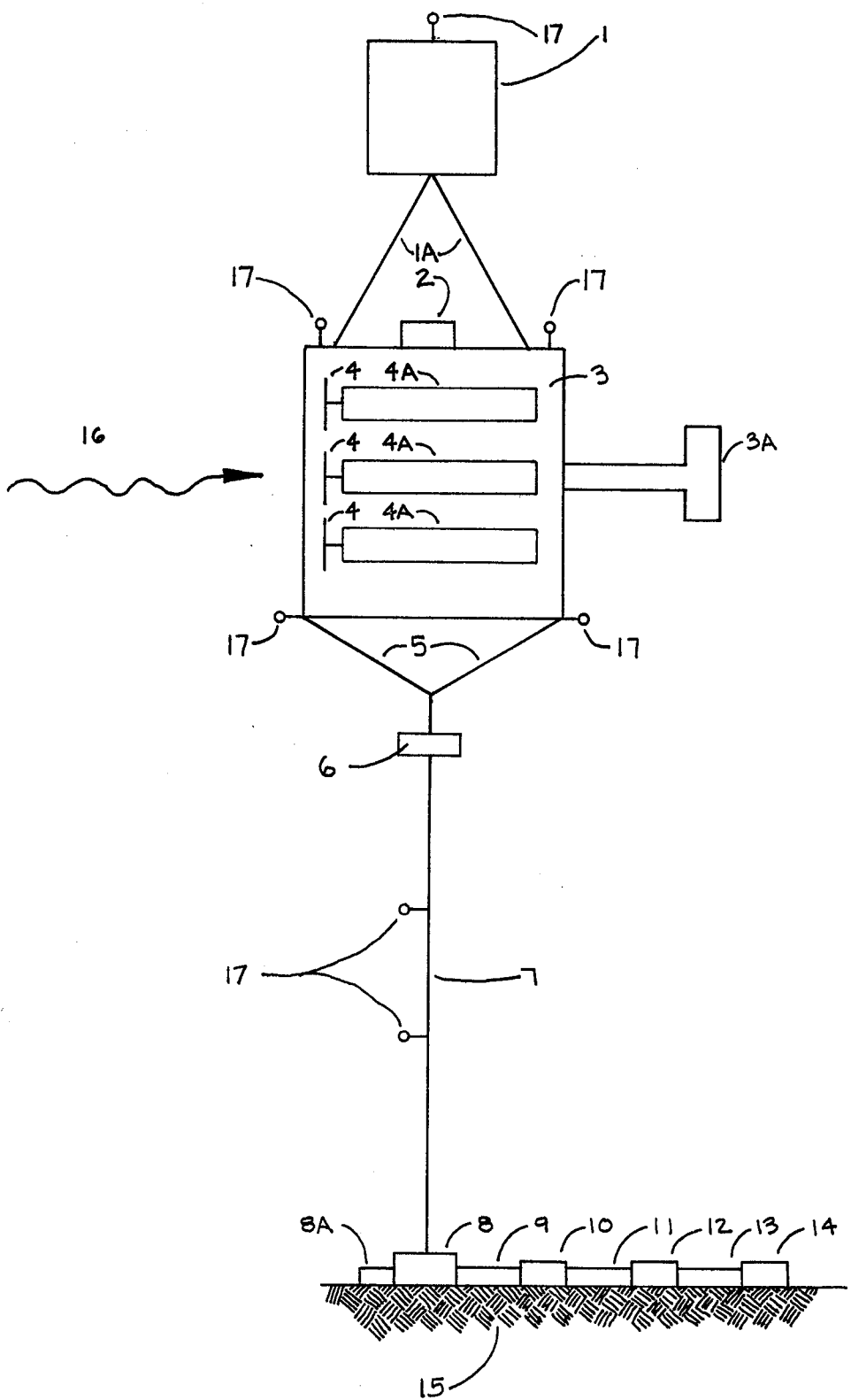

WIND GENERATOR KITE SYSTEM

BACKGROUND OF THE INVENTION

This invention relates to improvements in commercial wind generators in use and under test. Present systems use a supporting rigid tower and very large wind turbine blades. The two major cost items are the blades and the supporting tower. Also, the present wind generators are fixed in location and elevation which limits the wind velocity and output on an annual basis. Locations are usually selected for high annual wind speeds, but the load factor is very low at the optimum wind speed.

Present large units are limited for use in high speed winds above the design level. They are usually designed to shut down at high wind speeds to prevent damage to the large turbine blade.

The new method for generating wind energy is to suspend small conventional wind generators in the air by a cable and to raise and lower the wind generators to the best elevation for maximum wind speed and electrical output.

A survey of wind speed with elevation revealed that wind speeds are 3 to 4 times higher above ground level and have a higher load factor. The electrical energy generated is a function of the cube of wind speed.

Typical data obtained from the National Weather Service, which makes high altitude wind velocity measurements at numerous locations across the country, several times a day, are as follows.

| Elevation - Meters | Wind Speed - Knots |
| --- | --- |
| 0 | 14 |
| 296 | 31 |
| 853 | 41 |
| 2177 | 47 |
| 3604 | 58 |
| 3808 | 65 |

The new system has numerous small airplane-type propellers for driving conventional electrical generators which are both reasonable in cost. The propeller and generator rotors are mounted on the same shaft, rotating at the speed of wind. Generators may be high frequency aircraft type, DC type, or induction generators. The units are connected in parallel by cables to ground equipment which changes the output to a 60 HZ fixed voltage for supplying an existing electrical utility grid.

The small propellers are suitable for wind speeds of several hundred miles per hour. The weights of the generators and equipment are reduced by using non-metallic housings and materials. The kite structure has materials used in airplanes for light weight and high strength.

The high tower cost is replaced by high strength anchoring cables and the means to elevate and suspend the wind generator at high altitudes. The wind generators are held in the air by a structure similar to the principle of a kite. The wind, along with the high strength anchor cables, tend to hold the kite in place. To lift the generator into place, a helicopter-type rotor blade and a balloon are attached to the structure of the wind generator kite. They are controlled from the ground through control wires. Once airborne, the wind generator kite will be supported by the wind and hot gas balloon.

A single high strength anchoring cable is used for holding the wind generator kite. Control auxiliary power cables, electrical generator cables, and a natural gas pipe are attached to the anchoring cable for the electrical generators, helicopter-type engine, and hot gas balloon. A multiple large reel winch, power driven, raises and lowers the wind generator kite. The power cables, control cables, and gas pipes are on separate reels. They are attached to the anchoring cables on raising and removed when the kite is lowered.

The system has the advantage of being maneuverable to new locations on the ground and for making adjustments vertically for maximum wind velocity and electrical output. The wind generator kite has a tail rudder for orienting the kite to wind direction. The anchoring cable has a swivel which permits rotation of the kite.

A BRIEF DESCRIPTION OF THE DRAWING

FIG. 1 is a block diagram of the complete wind generator kite system suspended in the air.

A box-like kite is structured to support numerous electrical generators direct driven by airplane propeller blades.

The wind generator kite is attached at the top to a hot air balloon and rotary turbine blade as used on helicopters. The hot air balloon and rotary turbine blade are used to lift the kite into the air and to change elevation as needed. The hot air balloon and the wind help support the kite in the air.

The wind generator kite is anchored to the earth by a swiveled high strength cable.

Electric generator cables, auxiliary power cables, control cables, and a gas pipe are supported by the anchoring cable.

The auxiliary power cables are for navigation lights and excitation of the generator. The control cables are for the rotary turbine engine and hot gas balloon. The gas pipe is for the hot air balloon and rotary turbine engine.

The turbine of the electrical output of the system is controlled by raising and lowering the wind generator kite to the desired elevation for maximum air speed.

The wind generators are fixed on the kite structure. Rotation is possible by a swivel in the anchor cable. The structure rotates to align with the wind direction automatically by a tail rudder.

DESCRIPTION OF THE PREFERRED METHOD

FIG. 1 is a block diagram of the wind generator kite system.

A hot air balloon 1, is shown supporting a box-like kite structure 3.

A helicopter-type propeller 2, is attached to kite structure 3, and is mounted below balloon 1.

High strength cables 1A are used to anchor balloon 1 to kite structure 3.

Kite structure 3 is a four sided kite enclosure for supporting wind generators 4A and generator propellers 4.

High strength cables 5 connect kite structure 3 to high strength anchor cable 7. Anchor cable 7 has electric cables and gas pipes attached to it.

A swivel 6 in anchor cable 7 permits rotation of the kite structure 3. Tail rudder 3A rotates kite structure 3 in the direction of wind 16 for maximum rotation of propellers 4. Wind 16 help support kite structure 3 in the air.

Anchor cable 7 connects kite structure 3 to earth 15 through electric power driven winch 8, which has separate reels for electric generator power, auxiliary power, control circuits, and gas pipes. Control console 8A permits raising and lowering the kite structure 3.

Electric power cables 9 connect generators 4A to equipment 10, which transform electrical energy to 60 HZ voltage and meters output.

Electric cable 11 connects 60 HZ power output 10 to step-up transformer 12.

Electric cable 13 connects high voltage step-up transformer 12 to existing electric utility 14, transmission grid.

Navigator lights 17 are attached to structure balloon 1, kite structure 3, and anchor cable 7.

I claim:

1. A system for generating electric energy from wind power comprising the following:
   electric generators mounted in an airplane-type kite structure;
   said generators driven by airplane propellers;
   said kite structure suspended in air by wind speed and by a hot air balloon;
   said kite structure anchored to the earth by a high strength cable;
   means to raise and lower said structure to a position of maximum wind speed; said means comprising a second propeller; said second propeller being engine driven;
   said generators connected through electric cables to existing electrical utility grid.

2. A system for generating electric energy from wind power according to claim 1, where-in said wind generators are raised and lowered vertically to elevations of maximum wind speed for maximum electrical output.

3. A system for generating electrical energy from wind power according to claim 1, where-in said generators are raised to the upper atmosphere to reach regions of high wind speed.

4. A system for generating electrical energy from wind power according to claim 1, where-in said generators mounted in said kite structure suspended by said cable is free to rotate and orientate said generators to the direction of the wind.

5. A system for generating electrical energy from wind power according to claim 1, where-in said rotary propeller engine is natural gas driven.

6. A system for generating electrical energy from wind power according to claim 1, where-in said anchor cable is wound on a motor driven winch with sections for electric cables and gas pipes.

7. A system for generating electric energy from wind power according to claim 1, where-in the electric generators are high frequency aircraft type for small size and light weight.

8. A system for generating electrical energy from wind energy according to claim 1, where-in said electrical generator produce variable frequency outputs and are converted to a 60 HZ constant voltage output on the ground.

9. A system for generating electrical energy from wind energy according to claim 1, where-in said electrical generators are direct current type and the output is converted to a 60 HZ constant voltage on the ground.

10. A system for generating electrical energy from wind power according to claim 1, where-in said generators are raised and lowered from the ground.

11. A system for generating electrical energy from wind power according to claim 1, where-in said generators are electrically connected to ground by electric cables clamped to said anchoring cable.

12. Electric energy generating equipment driven by high speed winds at high altitudes such as a jet stream with large number of small turbine-generators suspended in the air comprising:
   said turbine generators with non-metallic enclosures and structure for light weight, wound for high frequency and high voltage outputs to reduce size and weight;
   said turbine-generators mounted in a light weight aerodynamic box shaped box structure to support self and said turbine-generators at high wind speeds; said generators propelled by airoplane type propellers suitable for high wind speeds;
   said kit structure anchored to earth by a single high strength rope;
   said kit structure and said anchor rope attached to engine driven propeller and supporting helium filled balloon which is propelled from the ground for raising and lowering said wind-generators to position of maximum wind speed by measuring the electric output on the ground;
   said wind-generators and said engine driven propeller connected to the ground by electric cables and gas pipe by clamping to the anchor wire;
   means for collecting said cable, said pipe, said anchor wire on ground;
   and means for converting and connecting electric power to 60 HZ utility grid.

13. Equipment according to claim 12 where-in said kite structure is free to rotate and orient in direction of the wind.

14. Equipment according to claim 12 where-in said lifting propeller is powered by an air motor.

15. Equipment according to claim 12 where-in said lifting propeller is powered by an electric motor.

16. Equipment according to claim 12 where-in said turbine-generators are small, light weight, high voltage DC generators.

* * * * *